(12) United States Patent
Nishiyama (10) Patent No.: US 8,505,972 B2
(45) Date of Patent: Aug. 13, 2013

(54) FOLDABLE STAY UNIT

(75) Inventor: Takashi Nishiyama, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 44 days.

(21) Appl. No.: 13/300,348

(22) Filed: Nov. 18, 2011

(65) Prior Publication Data
US 2012/0161426 A1 Jun. 28, 2012

(30) Foreign Application Priority Data

Dec. 24, 2010 (JP) ................................ 2010-287273

(51) Int. Cl.
*B60R 9/06* (2006.01)
(52) U.S. Cl.
USPC .............................. 280/769; 224/412; 224/413
(58) Field of Classification Search
USPC .................. 280/769; 248/691, 274.1, 309.1; 224/412–413
See application file for complete search history.

(56) References Cited

U.S. PATENT DOCUMENTS

| | | | | |
|---|---|---|---|---|
| 4,413,700 A | * | 11/1983 | Shiratsuchi | 180/219 |
| 7,448,523 B2 | * | 11/2008 | Aftanas et al. | 224/321 |
| 7,556,114 B2 | * | 7/2009 | Hanagan | 180/219 |
| 8,096,582 B2 | * | 1/2012 | Longwell et al. | 280/769 |
| 8,360,473 B2 | * | 1/2013 | Yamazaki et al. | 280/769 |
| 2002/0139596 A1 | * | 10/2002 | Yagisawa et al. | 180/219 |
| 2012/0161426 A1 | * | 6/2012 | Nishiyama | 280/769 |

FOREIGN PATENT DOCUMENTS

| | | |
|---|---|---|
| CN | 201568408 | 9/2010 |
| EP | 0 517 265 | 6/1992 |
| GB | 2 175 039 | 11/1986 |
| JP | 63-164094 | 10/1988 |

OTHER PUBLICATIONS

Chinese Application No. 201110405787.6 Office Action dated May 16, 2013, 10 pages with partial English translation.

* cited by examiner

*Primary Examiner* — Jeffrey J Restifo
*Assistant Examiner* — Erez Gurari (57) ABSTRACT

A foldable stay device arranged on a rear portion of a motorcycle includes a foldable stay unit secured to a seat rail. The foldable stay unit includes a base, a fastener stay supported by the base for pivotal movement between a projected position, in which the fastener stay protrudes outwardly of a motorcycle body in readiness for engagement with a luggage fastening member, and a folded position in which the fastener stay is accommodated inwardly of the projected position in a motorcycle width direction, and a carrier stud for supporting the fastener stay to permit the latter to undergo the pivotal movement between the projected and folded positions about a pivotal axis vertically extending. The fastener stay, when held at the projected position, is arranged above an outer tip line depicted by an outwardly bulged side portion of a rear cowl for covering the seat rail from the side.

10 Claims, 10 Drawing Sheets

FOLDABLE STAY UNIT

CROSS REFERENCE TO THE RELATED APPLICATION

This application is based on and claims Convention priority to Japanese patent application No. 2010-287273, filed Dec. 24, 2010, the entire disclosure of which is herein incorporated by reference as a part of this application.

BACKGROUND OF THE INVENTION

1. Field of the Invention

The present invention relates to a foldable stay device which may be arranged in a rear portion of a motorcycle for engagement with a tying tool such as, for example, rope or net.

2. Description of Related Art

As is well known to those skilled in the art, the motorcycle is generally provided with fastener stay members on a rear vehicle body so that when a luggage placed on the rear vehicle body is tied thereto by means of a luggage fastening member such as, for example, rope cord or net, sections of the luggage fastening member can be engaged with such fastener stay members. The Japanese Laid-open Utility Model Publication No. S63-164094, first published in 1988, discloses a foldable fastener stay member of a type in which, in order to avoid an undesirable contact thereof with an outside and also to increase the appearance while the fastener stay member is not in use, the fastener stay member can be projected only when it is in use, but can be folded when it is not in use. Specifically, the fastener stay member disclosed in this utility model publication is retractably supported below a motorcycle frame structure so that when not in use the fastener stay member can be accommodated inwardly of the rear cowl in a direction widthwise of the motorcycle body.

It has, however, been found that the fastener stay member disclosed in the above mentioned utility mode publication involves the following problem. Specifically, when a luggage placed on a fellow passenger's seat, then serving as a luggage carrier, is tied by a length of rope, the rope so used to tie the luggage traverses the rear cowl, positioned intermediate between the fastener stay member and the luggage carrier, in a vertical direction. Accordingly, there is a likelihood that a portion of the rope then traversing the rear cowl frictionally contacts the latter enough to press a corresponding portion of the rear cowl in a direction inwardly of the widthwise direction of the motorcycle body, resulting in an impairment to the rear cowl.

SUMMARY OF THE INVENTION

In view of the foregoing, the present invention has been devised to substantially eliminate the problems and inconveniences inherent in the prior art foldable fastener stay member and is intended to provide an improved foldable stay device effective to avoid the rear cowl being pressed by a luggage fastening member.

In order to accomplish the foregoing objects, the present invention provides a foldable stay device adapted to be arranged in a rear portion of a motorcycle, which includes a foldable stay unit secured to a motorcycle frame structure. The foldable stay unit in turn includes a base, a fastener stay operatively supported by the base for pivotal movement between a projected position, in which the fastener stay protrudes outwardly of a motorcycle body in readiness for engagement with a luggage fastening member, and a folded position in which the fastener stay is accommodated inwardly of the projected position in a direction widthwise of the motorcycle body, and a carrier stud for supporting the fastener stay to permit the latter to undergo the pivotal movement between the projected and folded positions about an axis of pivot extending in a substantially vertical direction with respect to the motorcycle frame structure. The fastener stay, when and so long as it be held at the projected position, is arranged above an outer tip line depicted by an outwardly bulged side portion of a rear cowl, used to cover at least one side of the rear portion of the motorcycle frame structure, which line is extending in a direction longitudinally of the motorcycle frame structure.

It is to be noted that the wording "outwardly bulged side portion of the rear cowl" referred to above is intended to mean a portion of the rear cowl, which is most bulged outwardly relative to the motorcycle body at any arbitrarily chosen location in the longitudinal sense of the rear cowl.

According to this structural feature, since the fastener stay is arranged above the outwardly bulged side portion of the rear cowl, the luggage fastening member such as, for example, a length of rope can be passed above the rear cowl and the outwardly bulged side portion in the rear cowl is prevented from being urged by the luggage fastening member then engaged with the fastener stay and, accordingly, a possible impairment of the rear cowls is avoided. Where the front fastener stay is not required, the fastener stay is folded to the folded position and, accordingly, the likelihood of the fastener stay being caught by the outside is avoided and the appealing appearance is also increased. Since the foldable stay unit is fitted to the motorcycle frame structure, the fastener stay can be stably supported by a vehicle body. Also, since the pivot axial extends in an up and down direction or substantially vertical direction, even when the space between the outwardly bulged side portion of the rear cowl and the fellow passenger's seat, which serves as a luggage carrier rack, in the substantially vertical direction is small, it is easy to arrange the foldable stay unit at this space.

In a preferred embodiment of the present invention, the fastener stay has at least one engagement section defined therein for engagement with the luggage fastening member and, when and so long as the fastener stay is held in the projected position, the at least one engagement section assumes a position widthwise of the motorcycle body, which is the same as that of the outwardly bulged side portion of the rear cowl, or a position somewhat inwardly of such widthwise position. According to this structural feature, since the fastener stay is positioned above the outwardly bulged side portion of the rear cowl and at a widthwise position of the motorcycle body, which is the same as the outwardly bulged side portion of the entire rear cowl or inwardly thereof, the likelihood of the rear cowl being pressed by the luggage fastening member can be avoided while the amount of projection in a direction outwardly of the rear cowl is suppressed.

The fastener stay referred to above is preferably arranged forwardly of the fellow passenger's seat. While in the motorcycle the fellow passenger's seat is generally concurrently used as a luggage carrier rack, positioning of the fastener stay at the folded position is effective to avoid a contact of the fellow passenger with the fastener stay.

In another preferred embodiment of the present invention, the foldable stay unit also includes a stopper member for regulating the stroke of pivotal movement of the fastener stay. According to this structural feature, since the pivotal movement more than necessary is regulated, a stabilized operation of the fastener stay can be secured. Also, even when the fattener stay is pulled by the luggage fastening member, the rotation more than necessary does not occur.

When and so long as the fastener stay is held at the folded position, the fastener stay is preferably concealed below a rider's seat from outside. According to this preferred feature, the fastener stay will be no longer conspicuous and, as a result thereof, the appearance of the motorcycle improves.

In a further preferred embodiment of the present invention, the fastener stay has at least one engagement section defined therein for engagement with the luggage fastening member and, when and so long as the fastener stay is held at the projected position, the engagement section is arranged on one side outwardly of the outwardly bulged side portion of the rear cowl, which portion occupies the same longitudinal position as the foldable fastener stay, in a direction widthwise of the motorcycle body. According to this preferred feature, when the luggage fastening member is engaged with or disengaged from the engagement section in the fastener stay, an undesirable contact of the luggage fastening member with the rear cowl below the engagement section can be avoided. It is to be noted that as a result that the fastener stay is positioned in the vicinity of a front end of the rear cowl or somewhat forwardly of such front end, there may be the possibility that the rear cowl is not formed at the same longitudinal position as the projected position, and, therefore, such possibility is equally encompassed.

In a different preferred embodiment of the present invention, the foldable stay device further includes a bracket through which the foldable stay unit is fitted to the motorcycle frame structure, and the foldable stay unit is fitted to the bracket by connecting the carrier stud with the bracket. According to this preferred feature, the foldable stay unit can be mounted on the bracket which has been secured to the motorcycle frame structure during the assembling step, in which the rear cowl, the seat and others are mounted on the motorcycle body, and, hence, the mounting work can be facilitated.

Where the carrier stud is coupled with the bracket, the bracket is preferably covered by the rear cowl laterally from outside. According to this feature, since the bracket is covered by the rear cowl, exposure of the bracket to the outside is prevented and the appearance of the motorcycle is therefore increased.

In a yet further preferred embodiment of the present invention, at least one rear fastener stay is employed rearwardly of the foldable stay unit for engagement with the luggage fastening member and is arranged above the outer tip line of the rear cowl. According to this feature, since the luggage can be supported at two, front and rear locations, the luggage fastening can be accomplished assuredly.

Any combination of at least two structural features disclosed and claimed in this specification, inclusive of the claims and the accompanying drawings, should be construed as included within the scope of the present invention. In particular, any combination of two or more of the appended claims in this specification should be construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

A preferred embodiment of the present invention will now be described in detail with reference to the accompanying drawings. In describing the present invention, however, the terms "front", "rear", "forward" and "rearward" that are used hereinabove and hereinafter are to be understood as relative terms descriptive of positions and/or directions taken with respect to the direction of forward travel of the motorcycle unless otherwise specified and that the term "left" and "right" similarly used hereinabove and hereinafter are to be understood as relative terms description of positions and/or direction as viewed from a motorcycle rider occupying the seat during the forward travel of the motorcycle.

Figure 1:
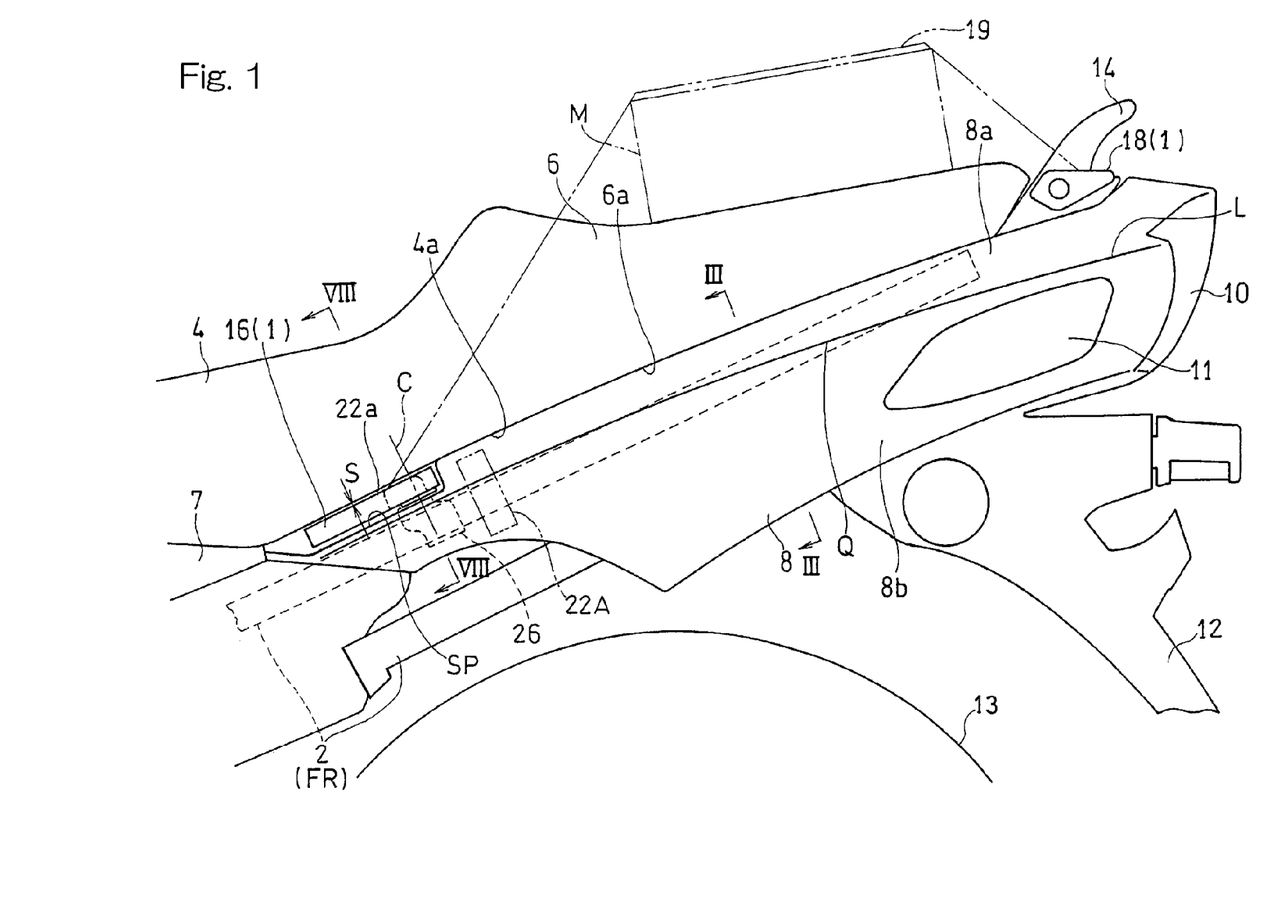
FIG. 1 is a left side view of a rear portion of a motorcycle including a seat assembly, which is equipped with one foldable stay unit according to a preferred embodiment of the present invention, the foldable stay unit being held in a folded position.
Figure 2:
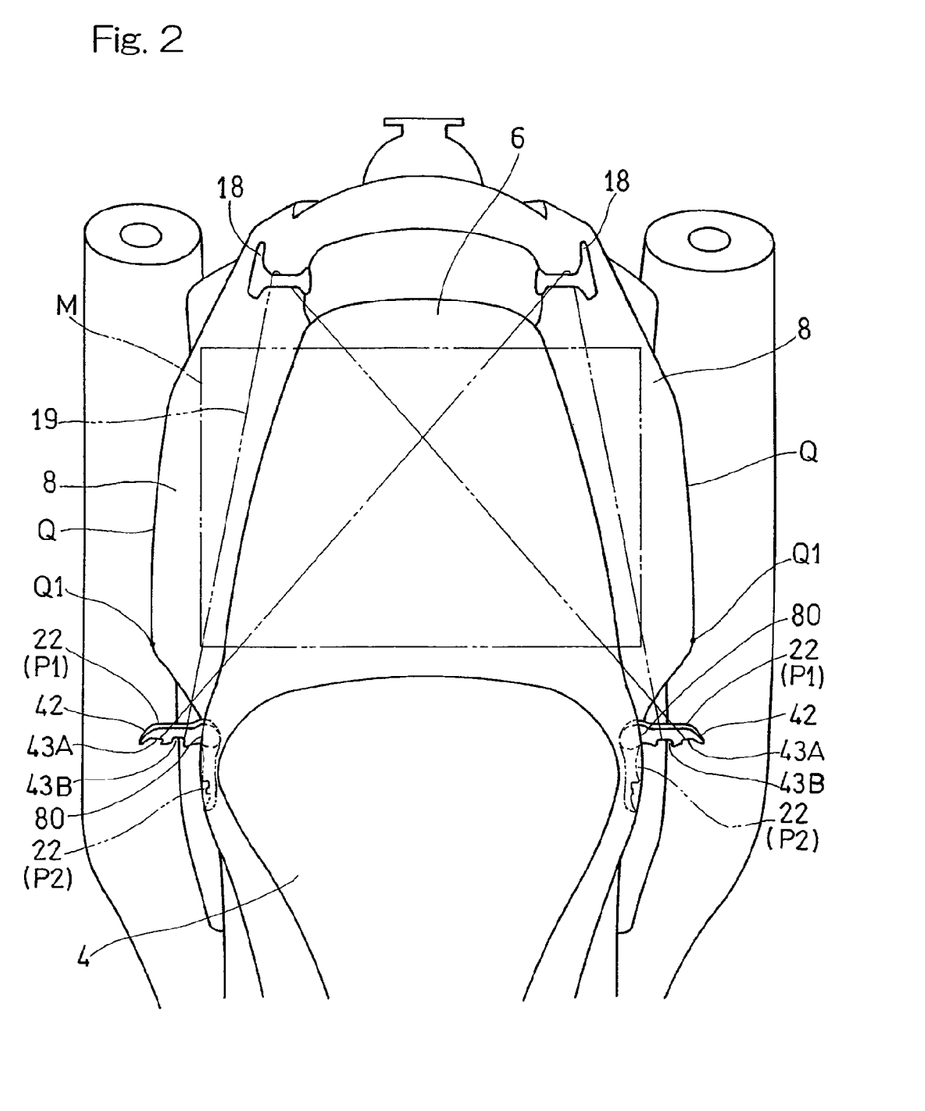
FIG. 2 is a top plan view showing the rear portion of the motorcycle in which the foldable stay unit is held in a projected position protruding laterally outwardly from the luggage carrying rack.

Referring particularly to FIGS. 1 and 2, there is schematically shown a rear portion of a motorcycle, which is equipped with at least left and right foldable stay units 16 forming parts of a foldable stay device 1 designed in accordance with the present invention. As best shown in FIG. 1, the motorcycle includes a motorcycle frame structure FR made up of a front frame substructure (not shown) and a rear frame substructure. The motorcycle frame structure FR includes left and right seat rails 2 extending substantially parallel to each other and forming respective parts of the motorcycle rear frame substructure, and a seat assembly made up of a rider's seat 4 and a fellow passenger's seat 6 is mounted on the seat rails 2 so as to extend in a direction generally parallel to the longitudinal sense of the motorcycle.

A region from a longitudinal intermediate portion of the motorcycle below the rider's seat 4 to a location forwardly thereof is covered by left and right side cowls 7, and at respective location rearwardly of the side cowls 7 and below the fellow passenger's seat 6, the left and right seat rails 2 are covered by respective rear cowls 8 made of a resinous material and secured to the associated seat rails 2. A rear lighting device 10 is fixedly supported by respective rear end portions of the seat rails 2 and left and right turn signal lamps 11 are fixedly supported by left and right sides of the rear portions of the seat rails 2. A rear flap or mud guard 12 is fitted to the rear portions of the seat rails 2 for enclosing an upper portion of a rear wheel 13 and a grip 14 for the fellow passenger is secured to the rear end portions of the seat rails 2 so as to protrude upwardly.

In accordance with the preferred embodiment of the present invention, the rear portion of the motorcycle is provided with left and right foldable stay units 16 and left and right stationary or second stays 18, with the foldable stay units 16 being positioned forwardly of the stationary stays 18, although the use of the left and right rear stationary stays 18 may not be essential and can therefore be dispensed with. Specifically, the left and right foldable stay units 16 are fitted to portions of the seat rails 2 rearwardly of and beneath the rider's seat 4, that is, forwardly of and beneath the passenger's seat 6. A luggage M placed on the passenger's seat 6 can be tied or otherwise fastened to the passenger's seat 6, having been constrained by a luggage fastening member 19 such as, for example, a cord, rope, strap or net, which is then engaged with respective front fastener stays 22 forming hook members of at least the left and right foldable stay units 16. The stationary stays 18, positioned rearwardly of the foldable stay units 16 and secured firmly to left and right portions of the grip 14, are additionally utilized to cooperate with the foldable stay units 16 so that the luggage M can be assuredly tied to the fellow passenger's seat 6.

Left and right rear cowls 8 extend along the seat rails 2 in a direction longitudinally of the motorcycle, and most of the left and right rear cowls 8 are positioned immediately below the fellow passenger's seat 6. Those rear cowls 8 have respective outwardly bulged side portions Q so shaped as to be bulged relative to each other in a direction outwardly widthwise of the motorcycle at a respective location generally intermediate of the vertical direction. Specifically, each of the rear cowls 8 has an upper inclined surface 8a, extending outwardly relative to the motorcycle frame structure FR in a direction widthwise of the motorcycle from an upper side edge thereof to the outwardly bulged side portions Q, and a lower inclined surfaces 8b, extending inwardly from the outwardly bulged side portions Q to a lower side edge thereof. A line connecting the respective bulged portions Q extends in a direction longitudinally of the seat assembly 2 so that the bulged portion Q may depict an outer tip line L extending diagonally upwardly from a position forwardly of the seat rails 2 in a manner similar to the seat rail 2.

Since as described above the seat rails 2 is upwardly inclined in a direction rearwardly of the motorcycle, the respective front fastener stays 22 of the left and right foldable stay units 16, positioned forwardly of the fellow passenger's seat 6, are spaced a relatively large distance from the top surface of the fellow passenger's seat 6 as compared with the case, in which they are arranged rearwardly of the fellow passenger's seat 6. Therefore, when the luggage M placed on top of the fellow passenger's seat 6 is tied by means of the luggage fastening member 19, the luggage fastening member 19 is elongated in a substantial amount of stretch and, hence, a fastening force of the luggage fastening member 19 then urging the luggage M downwardly against the top surface of the fellow passenger's seat 6 can be increased easily.

Figure 3:
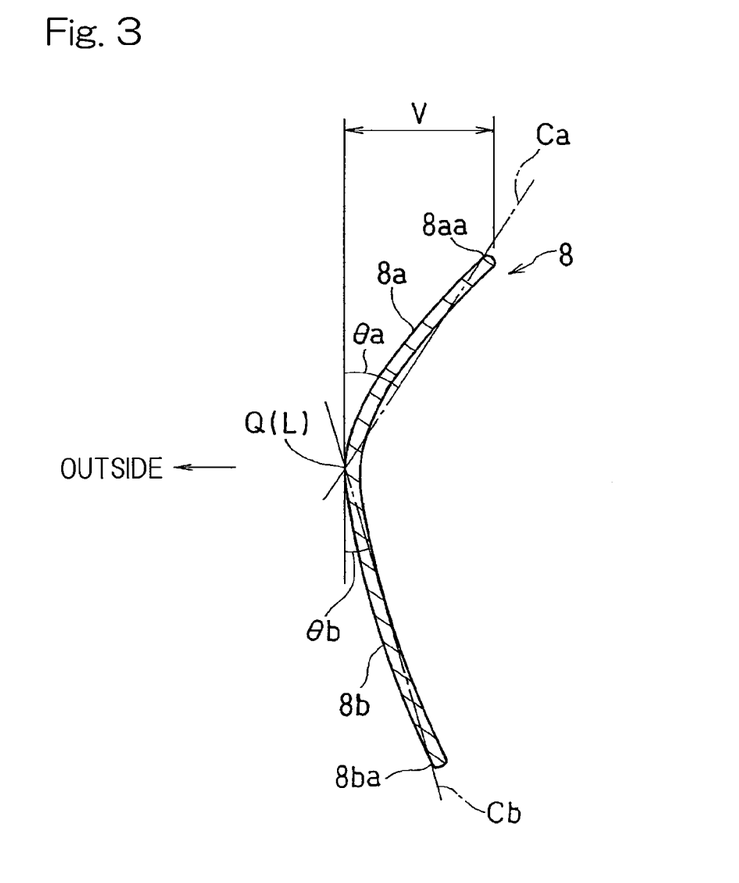
FIG. 3 is a cross sectional view taken along the line III-III in FIG. 1.

The lower inclined surface 8b of each of the left and right rear cowls 8 is so formed as to have a vertical dimension greater than that of the adjacent upper inclined surface 8a thereof. As best shown in FIG. 3, in the cross sectional representation taken at right angle to the outer tip line L depicted by the bulged portion Q in each rear cowl 8, the angle θa of inclination of the entire upper inclined surface 8a is chosen to be greater than the angle θb of the entire lower inclined surface 8b. More specifically, the angle θa delimited between the vertical line (parallel to the heightwise direction of the motorcycle) and the imaginary straight line Ca, which is drawn to extend between an upper side edge 8aa of the upper inclined surface 8a and the outermost point of the bulged portion Q, is chosen to be greater than the angle θb delimited between the vertical line and the imaginary straight line Cb, which is drawn to extend between a lower side edge 8ba of the lower inclined surface 8b and the outermost point line of the bulged portion Q. A portion of the outermost point line of the bulged portion Q in each rear cowl 8 in the vicinity of the fellow passenger's seat 6 is arranged at a location spaced a predetermined distance V, for example, 10 mm or more, in a widthwise direction laterally from the upper side edge 8aa of the respective rear cowl 8.

Figure 11:
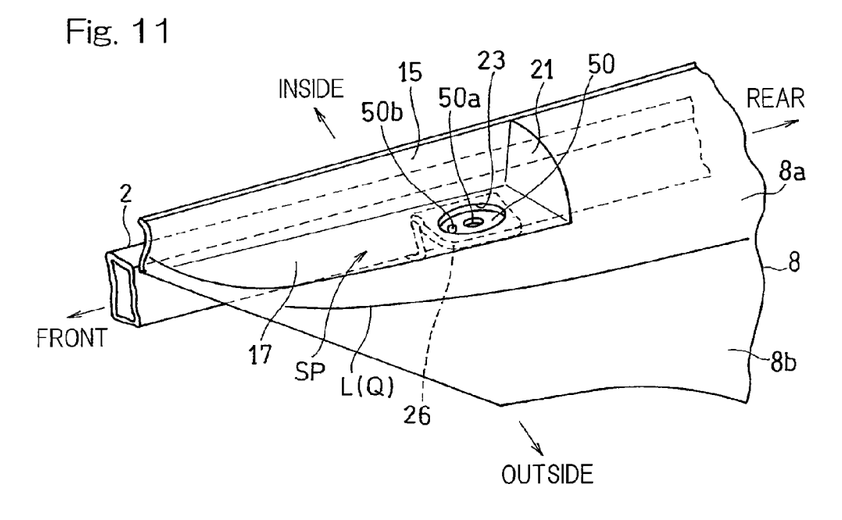
FIG. 11 is a perspective view showing the bracket and a rear cowl both fitted to the motorcycle body structure.

As shown in FIG. 2, a portion of each of the rear cowls 8, which is located forwardly of the fellow passenger's seat 6, is so shaped as to have a widthwise dimension, as measured in a direction widthwise of the motorcycle, which is gradually narrowed in a direction forwardly away from the fellow passenger's seat 6. Each of the rear cowls 8 has a forward end formed with a cutout (recess) SP as shown in FIG. 11. The cutout SP in the forward end of each rear cowl 8 is so shaped as to be downwardly depressed as compared with the remaining portion of the upper inclined surface 8a and is positioned above the outer tip line L, depicted by the bulged portion Q. The cutout SP is delimited by a substantially horizontally lying base face 17 defined in a portion of the upper inclined surface 8a adjacent the corresponding seat rail 2 so as to extend substantially horizontally, a side wall 15 lying in a direction parallel to the longitudinal sense of the respective rear cowl 8 and extending upright and upwardly from an inner edge of the base face 17 adjacent the seat rail 2, and a generally triangular rear side wall 21 extending upright and upwardly from a rear end of the base face 17 and deployed in a direction parallel to the widthwise direction of the motorcycle.

Figure 4:
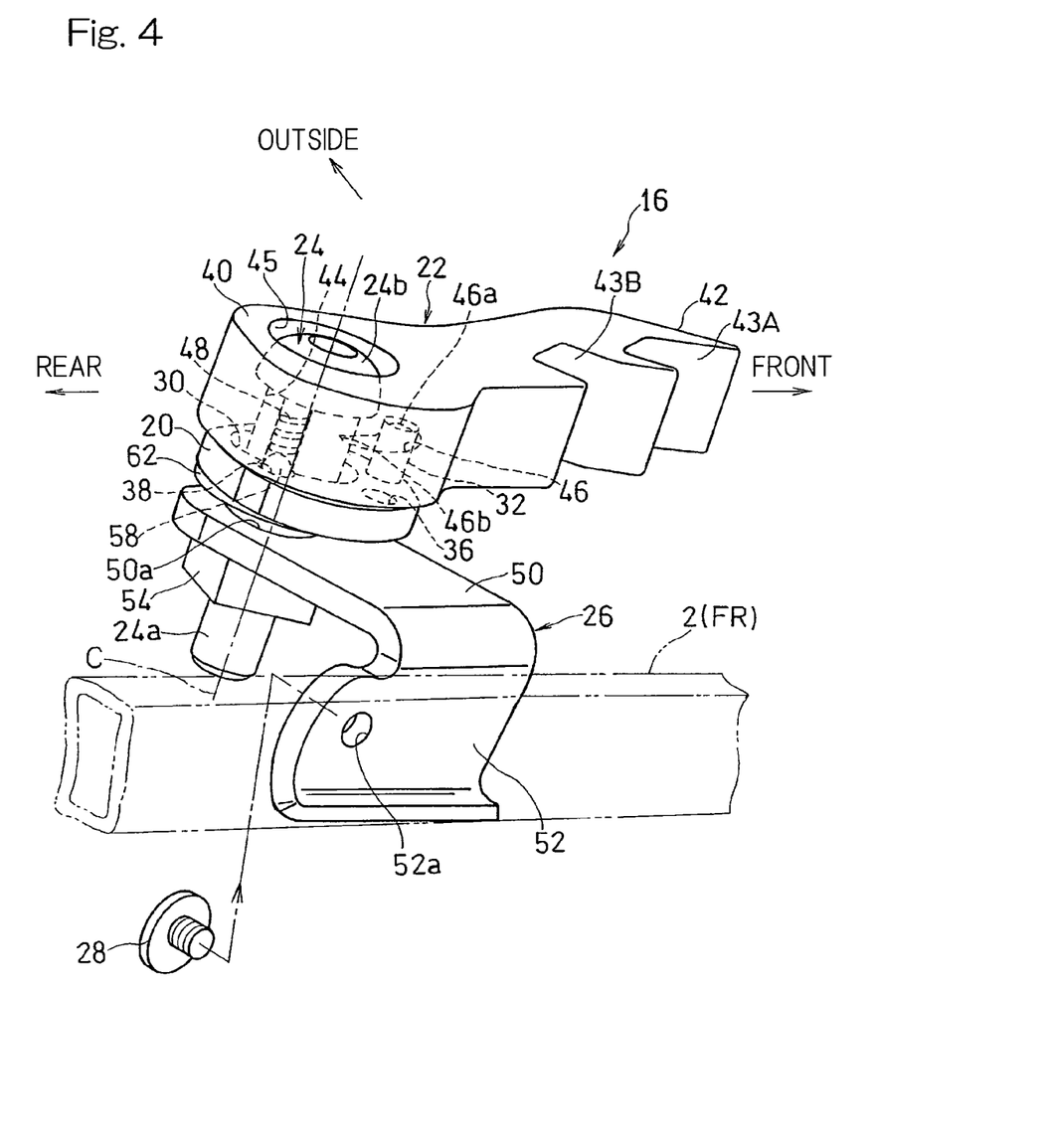
FIG. 4 is a perspective view of the left foldable stay unit as viewed from rearwardly of the motorcycle.

As best shown in FIG. 4 showing a perspective view of the right foldable stay units 16 as viewed from rear, each of the left and right foldable stay units 16 is made up of a base 20 in the form of a plate, the front fastener stay 22 for engagement with the luggage fastening member 19 (FIG. 1), and a carrier stud 24 through which the respective front fastener stay 22 is pivotably mounted on the base 20. The carrier stud 24 has one end fixed to the base 20 and has a longitudinal axis C extending in a substantially vertical direction. The front fastener stay 22 of each of the left and right foldable stay units 16 is supported by the corresponding carrier stud 24 for pivotal movement about the axis C of pivot to between a projected position P1 and a folded position P2. At the projected position P1 the front fastener stay 22 extends in a direction laterally outwardly of the motorcycle, as shown by the solid line in FIG. 2, in readiness for engagement with the luggage fastening member 19, and at the folded position P2 the front fastener stay 22 is folded inwardly to lie generally or substantially parallel to the longitudinal sense of the motorcycle as shown by the phantom line in FIG. 2.

It is to be noted that the axis C of pivot of the carrier stud 24, which defines the axis of pivot of the respective front fastener stay 22, may be tilted, for example, an angle of not greater than ±30°, preferably ±20° and, more preferably, ±15° relative to the vertical direction.

Since as hereinabove described the axis C of pivot of the carrier stud 24 extends in the substantially vertical direction, the respective foldable stay unit 16 can be arranged in a space available between the outwardly bulged side portion Q and the rider's seat 4 even when the front fastener stay 22 is substantially long and the dimension in the substantially vertical direction between the outwardly bulged side portion Q in each of the rear cowls 8 and the rider's seat 4 is small.

As shown in FIG. 1, the axis C of pivot preferably extends in a direction perpendicular to the top surface of the fellow passenger's seat 6, which defines a support surface for supporting thereon the luggage M, or a plane passing across respective longitudinal axes of left and right seat rails 2. In other words, the axis C of pivot preferably extends in a direction perpendicular to both of the direction, in which the seat rails 2 or the fellow passenger's seat 6 extend, and the direction widthwise of the motorcycle. More specifically, the axis C of pivot lies at a location outside the adjacent seat rail 2 and inwardly of the adjacent rear cowl 8 in the direction widthwise of the motorcycle and, also, at a rear portion of the base surface 17 with respect to the longitudinal direction of the motorcycle, with a free end of the associated fastener stay 22 in the folded position P2 positioned forwardly of the axis C of pivot.

With the axis C of pivot of each of the left and right foldable stay units 16 so arranged and so positioned as hereinabove described, as compared with the case in which the free end of the fastener stay 22 of the respective left or right foldable stay unit 16 in the folded position P2, no cutout is present in a portion rearwardly of the fastener stay 22, which portion forms a principal portion of the corresponding rear cowl 8, and, therefore, the cutout SP is hardly noticeable. Also, even when an elastic force or a tensioning force is received from the luggage fastening member 19, such a force acts in a direction counter to the direction towards the folded position P2, and therefore, the possibility of the respective fastener stay 22 being returned to the folded position P2 in a condition, in which the luggage is tied, can be avoided.

Figure 5:
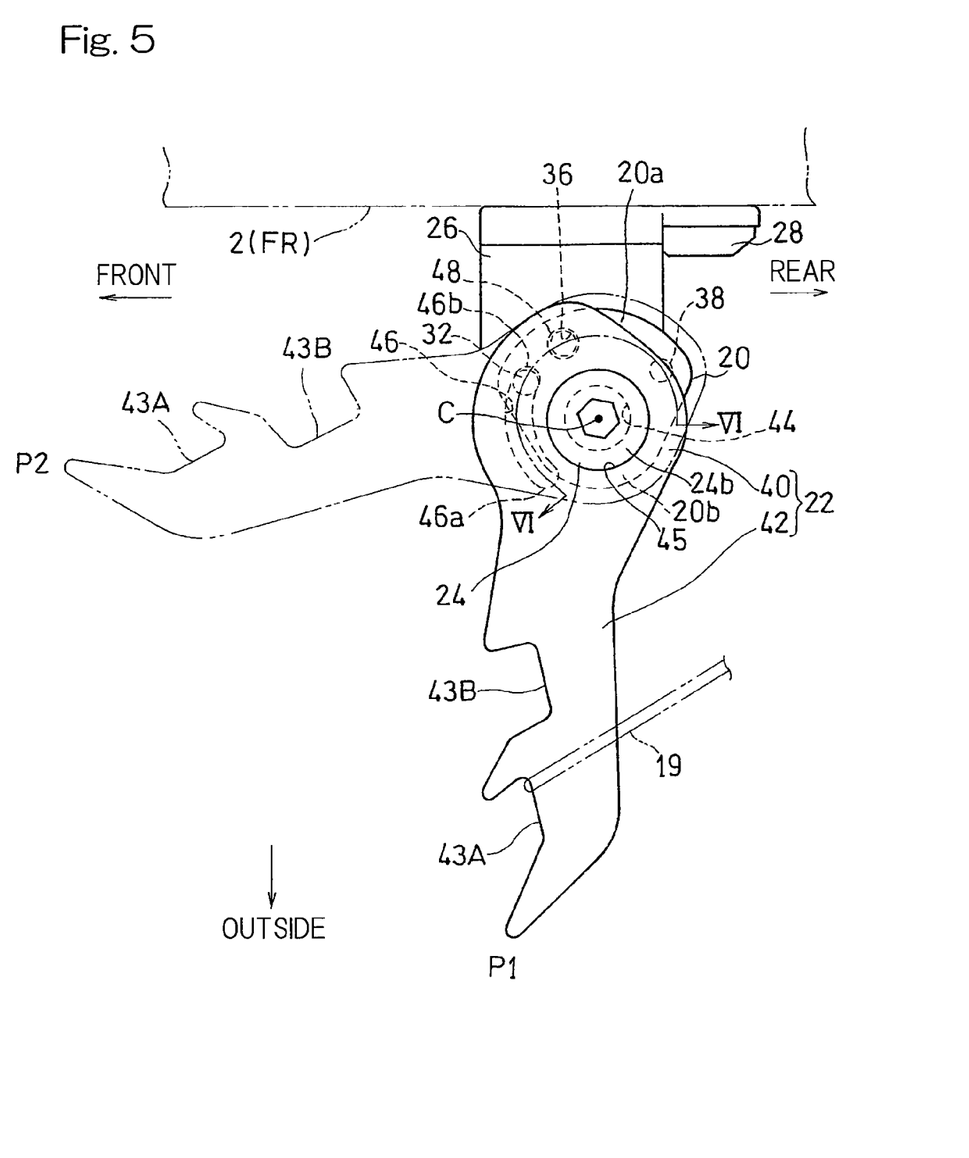
FIG. 5 is a top plan view showing the left foldable stay unit.

Referring to FIG. 5, the fastener stay 22 of each foldable stay unit 16 has a generally elongated rectangular sectional shape extending in a direction perpendicular to the axis C of pivot. A base end of the fastener stay 22 opposite to the free end thereof referred to previously forms a connecting portion 40 that is positioned in the vicinity of the axis C of pivot and is pivotally supported by the carrier stud 24.

The fastener stay 22 of each foldable stay unit 16 is made up of the connection portion 40, engaged pivotally on the carrier stud 24 in a manner as will be described later, and an elongated stay body 42 extending outwardly from the connection portion 40 and terminating at the free end thereof. The elongated stay body 42 is positioned a distance spaced from the pivot axis C in a direction radially outwardly of the connection portion 40 and has first and second engagement sections 43A and 43B defined in an axially spaced relation to each other in one side edge portion thereof for engagement with the luggage fastening member 19. When and so long as the front fastener stay 22 in each of the foldable stay unit 16 is held at the folded position P2, the direction of extension of the elongated stay body 42 thereof coincides substantially or generally with the direction of extension of the seat rails 2, that is, with the longitudinal direction of the motorcycle. On the other hand, when and so long as such front fastener stay 22 is held at the projected position P1, the direction of extension of the elongated stay body 42 thereof lies substantially or generally perpendicular to the direction of extension of the seat rails 2 and in other words, coincides substantially or generally with the widthwise direction of the motorcycle.

Because of the pivot axis C thus made to lie perpendicular to the seat rails 2, the respective fastener stay 22, when held at the folded position P2, can follows the direction of the adjacent seat rail 2 even though the front fastener stay 22 in each foldable stay unit 16 has a large dimension in the direction of extension thereof, that is, has a substantial length and, therefore, the front fastener stay 22 held at the folded position P2 is substantially invisible. Accordingly, if the front fastener stay 22 in each foldable stay unit 16 has such a substantial length, engagement of the luggage fastening member 19 in one or both of the first and second engagement sections 43A and 43B in the elongated stay body 42 can be facilitated.

When and so long as the fastener stay 22 in each foldable stay unit 16 is held at the folded position P2, the elongated stay body 42 thereof, which is spaced from the connection portion 40 thereof, is positioned forwardly of the pivot axis C with respect to the forward direction of the motorcycle. On the other hand, when and so long as the fastener stay 22 is held at the projected position P1, the elongated stay body 42 is positioned rearwardly of the elongated stay body 42 of the fastener stay 22, then held at the folded position P2, with respect to the forward direction of the motorcycle.

In the embodiment now under discussion, the elongated stay body 42, when the fastener stay 22 is held at the projected position P1, is positioned outwardly of the position which is substantially the same as a longitudinal position of the pivot axis C. In other words, the elongated stay body 42 can be displaceable angularly about the pivot axis C over an angle of 90° to selectively assume one of the folded and projected positions P2 and P1. Accordingly, the amount of laterally outward projection of the fastener stay 22 from the motorcycle body at the projected position P1 can be large. Also, when the motorcycle is viewed from lateral side as shown in FIG. 1, the front fastener stay 22 then held at the folded position P2 is exposed to the outside through the cutout SP in the rear cowl 8. Yet, the front fastener stay 22, when held at the projected position 1 as shown in FIG. 2, protrudes laterally outwardly from the motorcycle body beyond the rider's seat 4, but the front fastener stay 22, when held at the folded position P2 shown by the phantom line in FIG. 2, is positioned immediately beneath an outer side portion of the rider's seat 4 to the extent so that it will not be noticeable when viewed from above. On the other hand, the rear stationary stays 18 remain exposed outwardly of the grip 14 in a direction widthwise of the motorcycle at all times.

Referring now to FIG. 4, each of the left and right fastener stay units 16 is mounted on the adjacent seat rail 2 through a bracket 26. More specifically, the bracket 26 is of a generally L-shaped configuration including a stay support lug 50 and a motorcycle connection lug 52 and is secured to the adjacent seat rail 2, shown by the double dotted line, with the motorcycle connection lug 52 secured to the seat rail 2 at a location widthwise outwardly of the seat rail 2, but inwardly of the rear cowl 8. The respective fastener stay unit 16 is mounted on the stay support lug 50. As described above, the fastener stay unit 16 is mounted on the seat rail 2, not the rear cowl 8, through the bracket 26, and therefore, it can be firmly supported by the motorcycle body.

With the carrier stud 24 secured to the bracket 26, particularly the stay support lug 50 thereof, the fastener stay unit 16 is mounted on the bracket 26 after the bracket 26 has been fixedly mounted on the seat rail 2. It is to be noted that the foldable stay device 1 of the present invention is comprised of at least one foldable stay unit 16 and the associated bracket 26, although in the illustrated embodiment the foldable stay device 1 is shown as including the left and right foldable stay units 16, the brackets 26 and the left and right rear fastener stays 18 associated therewith.

The bracket 26 referred to above is mounted on the seat rail 2, which is rigid or otherwise integral with the motorcycle frame structure FR, with the motorcycle connection lug 52 bolted to the seat rail 2 by means of a fastening member 28 such as, for example, a bolt, wherefore the fastener stay unit 16 is supported by the motorcycle body. Accordingly, when the bracket 26 is fitted to a suitable portion of the motorcycle frame structure FR, the fastener stay unit 16 can be easily fitted to anywhere in the motorcycle body.

Also, since the bracket 26 for each of the foldable stay units 16 can be secured to the associated seat rail 2 before the rear cowl 8 on each side of the motorcycle is secured to such seat rail 2, the rear cowl 8 will not disturb the work to mounting the bracket 26 on the seat rail 2, thus facilitating the mounting of the bracket 26 on the seat rail 2. In addition, the positioning of the bracket 26 inwardly of the rear cowl 8 is effective to suppress the exposure of the bracket 26 to the outside and, therefore, not only can the appealing sense of beauty be increased, but also there is no need to apply a paint coat to the bracket 26 to increase the appealing sense of beauty. Moreover, since the seat assembly including the rider's seat 4 and the fellow passenger's seat 6 can be mounted after the foldable stay unit 16 on each side of the motorcycle has been fixed to the associated seat rail 2, there is no likelihood that the mounting of the bracket 26 on each of the seat rails 2 may be disturbed by the presence of the rider's and fellow passenger's seats 4 and 6, and, therefore, the mounting of each of the foldable stay units 16 can be facilitated.

As best shown in FIG. 5, the flat base 20 represents a substantially sector shape when viewed from above, having an arcuate portion 20a oriented inwardly of the motorcycle body to confront the adjacent seat rail 2. A base portion 20b of the base 20 positioned on one side of the sector shaped arcuate portion 20a outwardly of the motorcycle body is formed with a throughhole 30, shown in FIG. 4, into which the carrier stud 24 is inserted. The arcuate portion 20a of the base 20 has an upper surface formed with a guide pin 32, a first engagement hole 36 and a second engagement hole 38 positioned in this specific order from front on the imaginary circle depicted about the pivot axis C.

Figure 6:
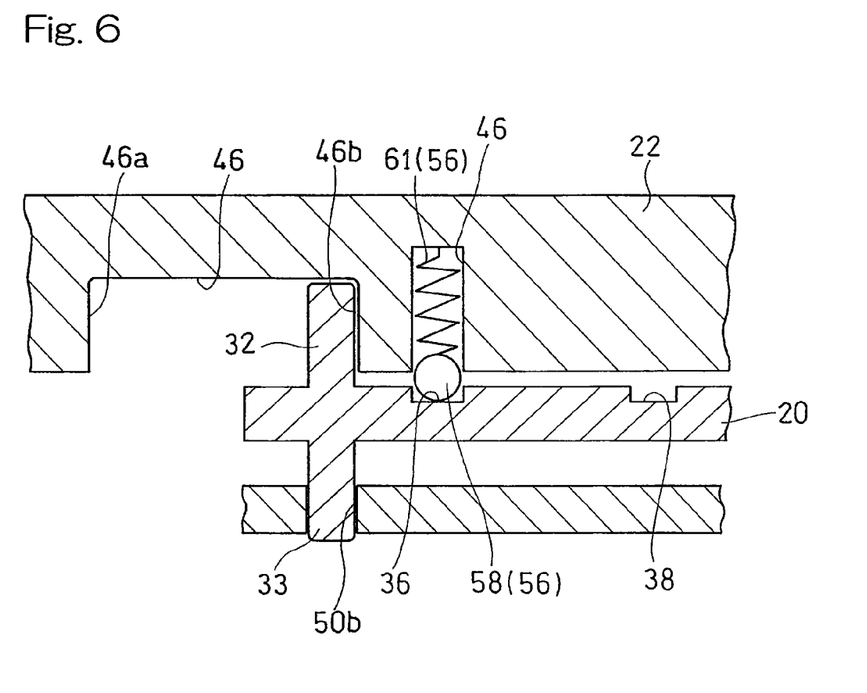
FIG. 6 is a cross sectional view taken along the line VI-VI in FIG. 5.

Referring particularly to FIG. 6, the guide pin 32 is a cylindrical projection protruding in a direction perpendicular to the upper surface of the base 20 and each of the first and second engagement holes 36 and 38 is in the form of a round blind hole recessed in a downward direction inwardly of the base 20. The base 20 has an undersurface provided with a detent pin 33 in the form of a cylindrical projection protruding downwardly in a direction perpendicular to the undersurface thereof. The guide pin 32 and the detent pin 33 are positioned on the same axis, that is, are coaxially aligned with each other, but may be displaced in position from each other.

The front fastener stay 22 best shown in FIG. 5 is made up of the connection portion 40, coupled with the base 20, and the elongated stay body 42 engageable with the luggage fastening member 19 as hereinbefore described. The connection portion 40 is formed with a stud insertion hole 44 for the passage of a stud portion 24a of the carrier stud 24 therethrough as shown in FIG. 4 and a recess 45 for receiving a head portion 24b of the carrier stud 24, and is also formed at a portion thereof radially outwardly of the stud insertion hole 44 with an arcuate guide groove 46 coaxial with the stud insertion hole 44, that is, with the pivot axis C. The arcuate guide groove 46 extends about the pivot axis C, best shown in FIG. 5, a length equal to the angular distance of substantially 90° about the pivot axis C. The front fastener stay 22 has a spring insertion hole 48 defined therein at a location rearwardly of the guide groove 46.

As hereinbefore described, the elongated stay body 42 of the front fastener stay 22 in each of the foldable stay units 16 has defined therein the first and second engagement sections 43A and 43B each being in the form of a different shape and depth. It is, however, to be noted that the number of the engagement sections may not be necessarily limited to two such as shown and described, but may be one or three or more. The use of a plurality of engagement sections 43A and 43B is effective to allow the luggage fastening member 19 to be tied in numerous ways depending on the size and/or shape of the luggage M to be supported on the fellow passenger's seat 6.

A detent mechanism 56 is employed in each of the foldable stay units 16 and positioned between the front fastener stay 22 and the base 20. As best shown in FIG. 6, this detent mechanism 56 is made up of the first and second engagement holes 36 and 38 defined in the upper surface of the base 20, a detent ball 58 and a spring element 61 accommodated within the spring insertion hole 48, defined in the front fastener stay 22, for biasing the ball 58 so as to engage in one of the first and second engagement holes 36 and 38. This detent mechanism 56 is so designed and so configured that when and so long as the detent ball 58 then biased by the spring element 61 is engaged in the first engagement hole 36, the front fastener stay 22 can be retained at the projected position P1 as shown by the solid line in FIG. 5, but when and so long as the detent ball 58 is engaged in the second engagement hole 38, the front fastener stay 22 can be retained at the folded position P2 shown by the phantom line in FIG. 5. However, when a rotational force of a value greater than a predetermined value is applied to the front fastener stay 22, the detent ball 58 is disengaged from the first or second engagement section 36 or 38 while being displaced against the biasing force of the spring element 61 and, hence, the detent ball 58 then retained in either the first engagement section 36 or the second engagement section 38 can be released from the first or second engagement section 36 or 38. With the detent mechanism 56 so configured as hereinabove described, not only can the positioning of the front fastener stay 22 be performed assuredly, but also since the spring element 61 of a large size can be accommodated within the spring insertion hole 48 on the side of the front fastener stay 22, the base 20 can have a small thickness.

Also, the guide pin 32 provided in the base 20 is engaged in the guide groove 46 defined in the front fastener stay 22 and, accordingly, as the front fastener stay 22 is pivoted about the pivot axis C, the guide pin 32 slidingly move within and along the guide groove 46 until it is brought into engagement with either one of the opposite ends 46a and 46b of the guide groove 46. Thus, the guide pin 32 cooperates with the arcuate guide groove 46 to define the stroke of angular movement of the front fastener stay 22 about the pivot axis C between the projected and folded positions P1 and P2.

The use of the guide pin 32 and the arcuate guide groove 46 is effective to enable the front fastener stay 22 to be operated stably. In other words, the guide pin 32 serves as a stopper member in the foldable stay unit 16. The front fastener stay 22 in each of the foldable stay units 16 is made of, for example, an aluminum alloy and the base 20, the carrier stud 24, the guide pin 32 and the detent pin 33 are made of a steel material. Also, the bracket 26 and the ball 58 of the detent mechanism 56 are also made of a steel material and a welded nut 54 and a flanged collar 60, both as will be described later, are yet made of a steel material.

Figure 7:
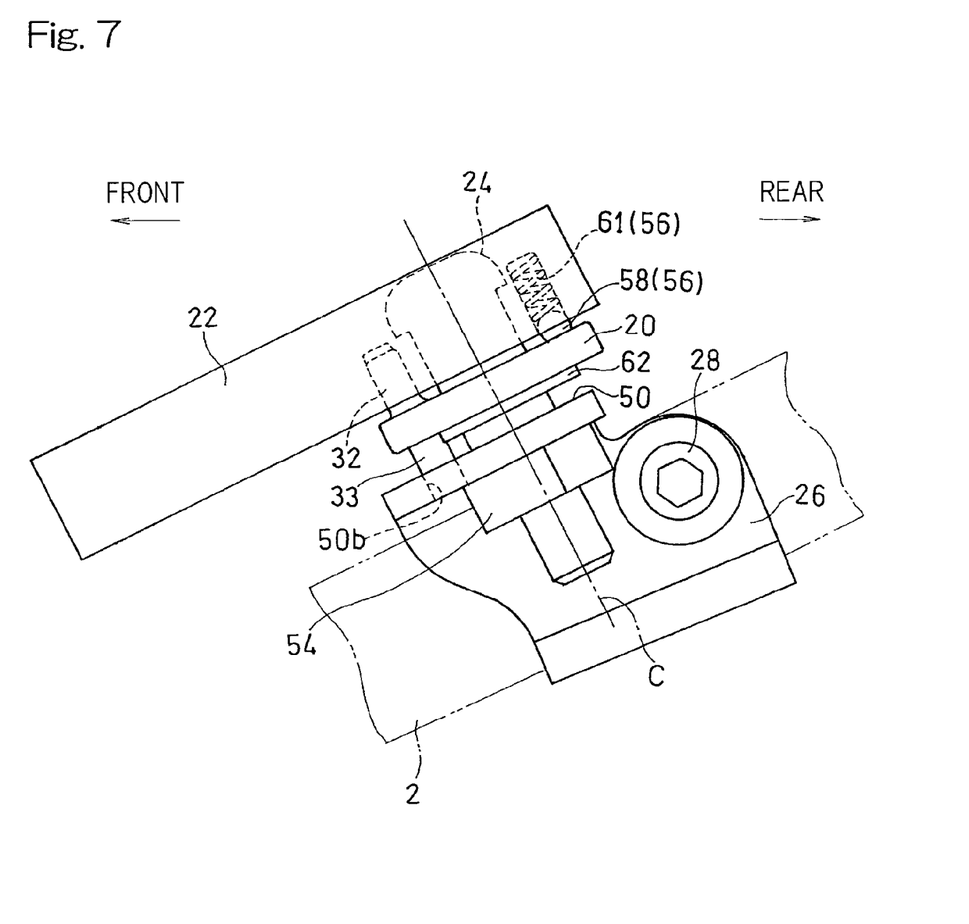
FIG. 7 is a left side view of the left foldable stay unit.

As clearly shown in FIG. 7, the carrier stud 24 for connecting the front fastener stay 22 to the bracket 26 is in the form of a fastening member such as, for example, a bolt and is used to connect the base 20, the front fastener stay 22 and the bracket 26 together. As hereinbefore described, the bracket 26 best shown in FIG. 4 is made up of the stay support lug 50 for supporting the foldable stay unit 16 and the connection lug 52 adapted to be secured to the adjacent seat rail 2. The connection lug 52 is formed with a bolt insertion hole 52 and is secured to the adjacent seat rail 2 by passing the fastening member 28 through the bolt insertion hole 52a from outside of the motorcycle body and subsequently threading it into a threaded hole (not shown) defined in the seat rail 2 by means of, for example, a self-locking nut.

Figure 8:
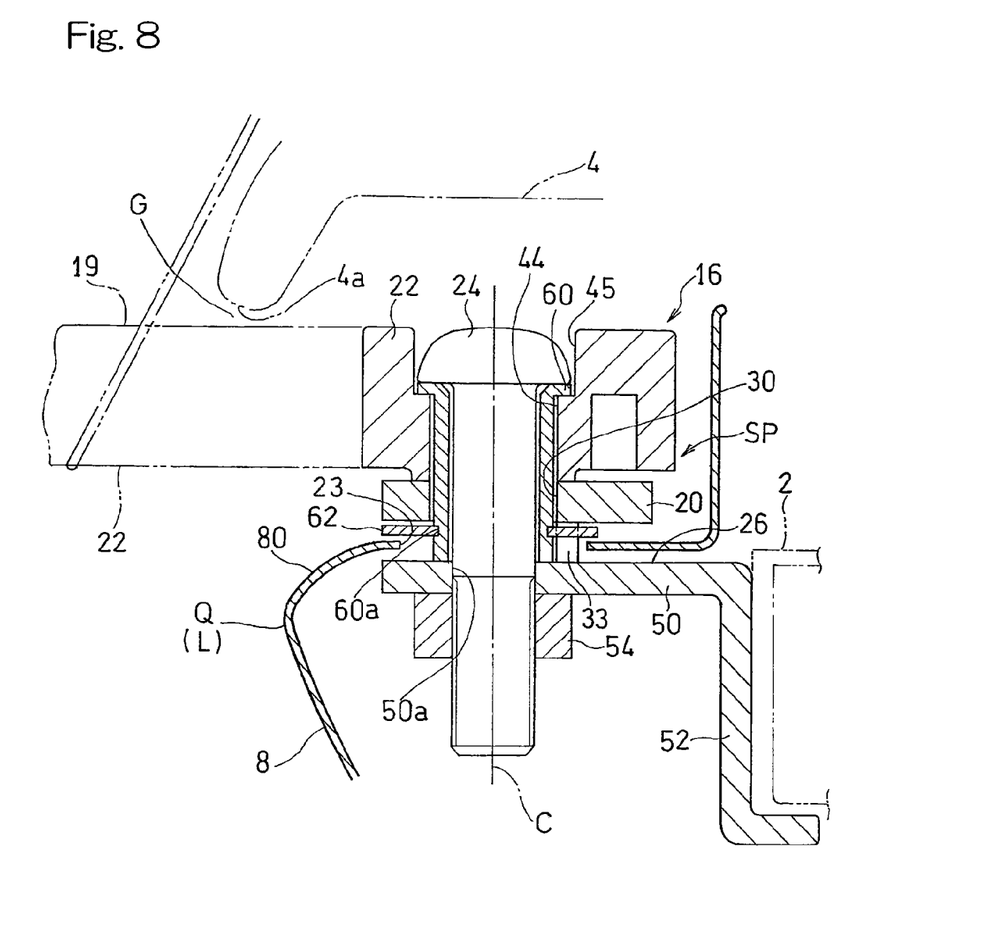
FIG. 8 is a cross sectional view taken along the line VIII-VIII in FIG. 1.

Referring to FIG. 8, the stay support lug 50 of the bracket 26 has a bolt insertion hole 50a for the passage of the carrier stud 24 therethrough and the welded nut 54 is secured to a portion of an undersurface of the stay support lug 50 in alignment with the bolt insertion hole 50a. The flanged collar 60 is inserted in part in the stud insertion hole 44 in the front fastener stay 22 and in part in the throughhole 30 defined in the base 20 and, therefore, the front fastener stay 22 and the base 20 are mounted on the bracket 26, particularly the stud support lug 50 in a condition of a lower end face of the flanged collar 60 brought into contact with an upper surface of the stay support lug 50 when the carrier stud 24 then passed through the flanged collar 60 is threaded into the welded nut 54 then secured to the undersurface of the stay support lug 50. A detent member 62 such as, for example, a generally C-shaped clip is engaged in an annular engagement groove 60a defined in a portion of an outer periphery of the flanged collar 60 below the base 20. The stay support lug 50 best shown in FIG. 7 has a positioning hole 50b defined therein so as to extend completely across the thickness thereof and the detent pin 33 rigid or integral with the base 20 is engaged in this positioning hole 50b to prevent a rotation of the base 20 about the pivot axis C relative to the stay support lug 50.

As hereinabove described, when the bracket 26 is arranged on one side of the adjacent seat rail 2 outwardly of the widthwise direction of the motorcycle body, that is, secured to one side face of the adjacent seat rail 2 oriented outwardly of the motorcycle body, the pivot axis C of the foldable stay unit 16 can be disposed on that side of the seat rail 2 outwardly of the widthwise direction of the motorcycle. Accordingly, as compared with the pivot axis C defined at a location inwardly of the seat rail 2 or above the seat rail 2, the front fastener stay 22 may have a small length in order to secure the projected position similar to that afforded if the pivot axis C were to be disposed inwardly or above the seat rail 2.

The position at which each of the foldable stay device 1 is fitted will now be described. As best shown in FIG. 8, the rear cowl 8 is smoothly curved so as to bulge outwardly of the motorcycle body, leaving the outwardly bulged portion Q, which is bulged outwardly of the motorcycle body in the widthwise direction of the latter, at the location somewhat below the upper edge of the rear cowl 8. It is to be noted that the wording "outwardly bulged side portion Q" of the rear cowl 8 is intended to mean a portion of the rear cowl 8, which is most bulged outwardly relative to the motorcycle body at any arbitrarily chosen location on the longitudinal sense of the rear cowl 8, that is, the widest portion of the rear cowl 8. The front fastener stay 22 is positioned above the outer tip line L depicted by the bulged portion Q as shown in FIG. 1.

Also, the elongated stay body 42 of the front fastener stay 22, when and so long as held at the projected position P1 as shown by the solid line in FIG. 2, is arranged outwardly more than one side of a portion 80 of the rear cowl 8, which is at the same position as that of the front fastener stay 22 with respect to the longitudinal sense of the motorcycle body and which is outwardly of the widthwise direction of the motorcycle body. In other words, no rear cowl 8 exist below the engagement sections 43A and 43B in the front fastener stay 22 when and so long as the latter is held at the projected position P1. Accordingly, even when, for example, the luggage fastening member 19 has opposite ends constituted by respective metallic members, the likelihood of the rear cowl 8 being impaired in contact with the metallic members at the opposite ends of the luggage fastening member 19 can be prevented.

At the folded position P2 as shown by the dashed line, the elongated stay body 42 of the front fastener stay 22 is positioned on one side of that portion 80 inwardly of the outwardly bulged side portion Q in the widthwise direction of the motorcycle body and, also, inwardly of an outer side portion of the rider's seat 4 with respect to the widthwise direction of the motorcycle body. The outermost engagement section 43A defined in the elongated stay body 42 is held at the same position as the widest portion of the rear wise cowl 8, that is, the outermost area Q1 of the outwardly bulged side portion Q with respect to the widthwise direction of the motorcycle body. However, since the outermost engagement section 43A is positioned above the outer tip line L shown in FIG. 1, it is possible to prevent the luggage fastening member 19, then engaged in the outermost engagement section 43A, from contacting the rear cowl 8. It is, however, to be noted that the outermost engagement section 43A may be arranged inwardly of the outermost area Q1 of the outwardly bulged side portion Q with respect to the widthwise direction of the motorcycle body. On the other hand, the innermost engagement section 43B, when the elongated stay body 42 is held at the projected position P1, is positioned inwardly of the outwardly bulged side portion Q1 of the rear cowl 8.

As shown in FIG. 1, when and so long as the front fastener stay 22 is held at the folded position P2 shown by the solid line, the front fastener stay 22 extends parallel to the lengthwise direction of the adjacent seat rail 2 so as to be substantially concealed beneath the rider's seat 4 when viewed from above as shown in FIG. 2. The front fastener stay 22 shown in FIG. 1 is arranged in the vicinity of a location below a lower edge 4a of the rider's seat 4 or below a lower edge 6a of the fellow passenger's seat 6, for example, at a location where the space S between the lower edge 4a of the rider's seat 4 or the lower edge 6a of the fellow passenger's seat 6 and an upper edge 22a of the front fastener stay 22 is chosen to be not greater than 20 mm and preferably not greater than 10 mm. Thus, the front fastener stay 22 will become unnoticeable. If the lower edge 4a of the rider's seat 4 is made parallel to the upper edge 22a of the front fastener stay 22, the front fastener stay 22 will become further unnoticeable. Also, when the front fastener stay 22 is pivoted about the substantially vertical pivot axis C, the front fastener stay 22 then held at the folded position P2 shown in FIG. 2 by the phantom line can be made yet further unnoticeable. In contrast thereto, if the axis C of pivot of the front fastener stay 22 is disposed in the longitudinal direction, a fastener stay 22A will assume a vertically long shape as shown by the double dotted line in FIG. 1 and will therefore be exposed considerably from a vertically intermediate portion of the rear cowl 8 as viewed from side, thus reducing the appealing appearance of the rear cowl 8.

Each of the rear fastener stays 18 is of a stationary type and is screwed to the grip 14. It is noted that the rear fastener stays 18 may be formed integrally with the grip 14 by means of a molding technique. As is the case with the front fastener stays 22, the rear fastener stays 18 are also arranged above the outer tip line L in the rear cowl 8. Also, the rear fastener stays 18 are provided above the fellow passenger's seat 6. Accordingly, the likelihood that the luggage fastening member 19 then extending between the rear fastener stays 18 and the front fastener stays 22 may contact the rear cowl 8 can be reduced.

Figure 9:
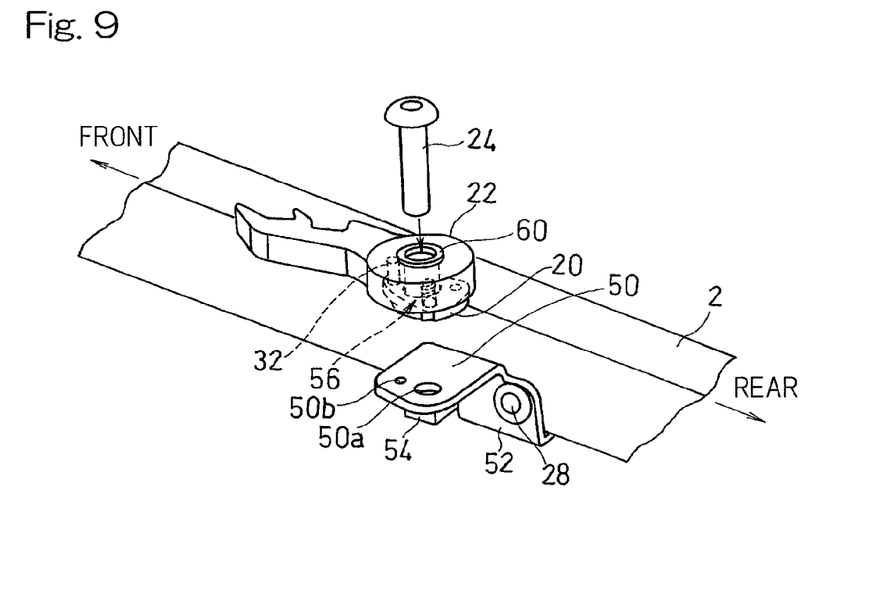
FIG. 9 is a perspective view showing how a bracket for each of the foldable stay units is fitted to a motorcycle body structure.
Figure 10:
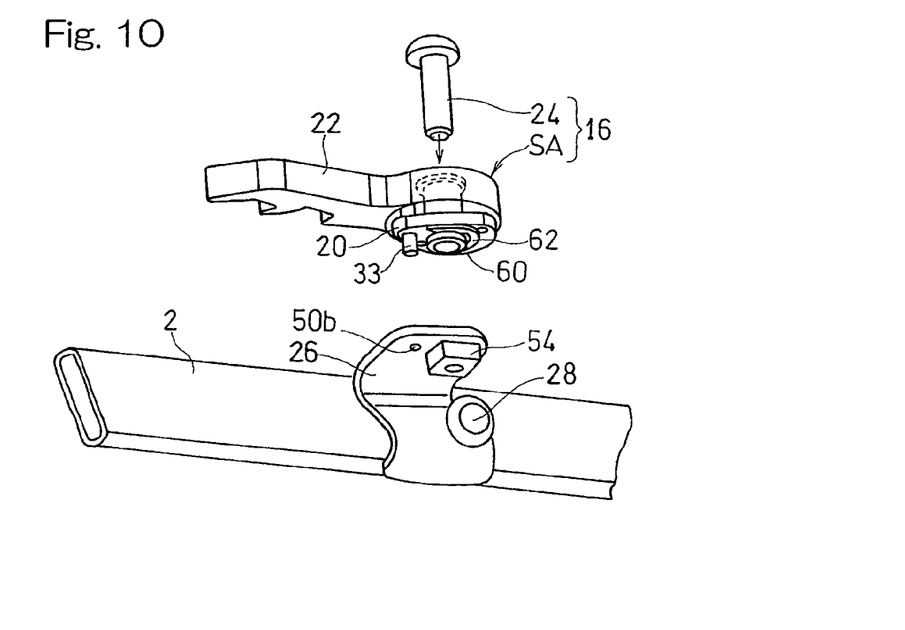
FIG. 10 is a perspective view of FIG. 9 as viewed from downwardly.

The manner of assembling the foldable stay device will now be described. As shown in FIG. 9, at the outset, the bracket 26 is secured to the adjacent seat rail 2 by means of the fastening member 28. Subsequently, while the detent mechanism 56 is inserted in between the base 20 and the front fastener stay 22, the flanged collar 60 best shown in FIG. 8 is inserted into the stud insertion hole 44 in the front fastener stay 22 and the throughhole 30 in the base 20. The detent member 62 is then engaged in the engagement groove 60a in the flanged collar 60. In this way, a subassembly SA shown in FIG. 10 is assembled. Thereafter, as shown in FIG. 11, the corresponding rear cowl 8 is secured to the seat rail 2. In this condition, a portion of the stay support lug 50 of the bracket 26 is exposed through the throughhole 23 defined in a rear portion of the base 17 of the cutout SP.

Figure 12:
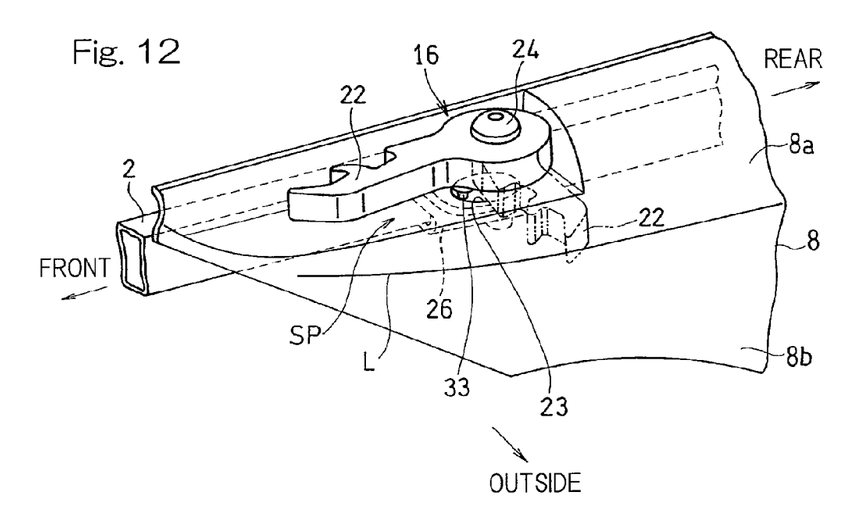
FIG. 12 is a perspective view showing the left foldable stay unit in a condition mounted on the motorcycle body structure.

Thereafter, the flanged collar 60, shown in FIG. 9, and the detent pin 33 rigid with the base 20 are passed through the throughhole 23 in the rear cowl 8 and the subassembly SA is mounted on the bracket 26. In this condition, when the carrier stud 24 then extending through the hollow of the flanged collar 60 is subsequently threaded into the welded nut 54, the right foldable stay unit 16 comprised of the subassembly SA and the carrier stud 24 is coupled with the bracket 26 as shown in FIG. 12. In this way, the right foldable stay unit 16 is supported by the seat rail 2 through the bracket 26. In this condition, the throughhole 23 in the rear cowl 8 is covered by the foldable stay unit 16 and is therefore unvisible from outside. After the right foldable stay unit 16 has been supported by the seat rail 2 in the manner described above, the seat assembly including the rider's and fellow passenger's seats 4 and 6 is mounted on the seat rails 2.

In order to bring the front fastener stay 22, then mounted on the seat rail 2, from the folded position P2 to the projected position P1, one must insert a finger into a gap G, as shown in FIG. 8, between the rider's seat 4 and the foldable stay unit 16 in readiness for engagement with the first engagement section 43A in the front fastener stay 22 and, after the finger has engaged the first engagement section 43A, the finger has to be withdrawn outwardly to pull the front fastener stay 22 to move it angularly about the pivot axis C from the folded position P2. By so doing, while the detent ball 58 best shown in FIG. 6 is engaged in the first engagement hole 36, the front stay unit 16 is positioned to the projected position P1.

Conversely, if the front fastener stay 22 is desired to be returned from the projected position P1 back to the folded position P2, one has to push the front fastener stay 22 to angularly move the latter about the pivot axis C from the projected position P1 back toward the folded position P2 and, by so doing, the front fastener stay 22 can be held at the projected position P2 the moment the detent ball 58 is brought into engagement with the second engagement hole 38.

According to the embodiment described above, since the front fastener stay 22 in each of the foldable stay units 16 is arranged above the outer tip line L depicted by the outwardly bulged side portion Q of the rear cowl 8 best shown in FIG. 1, the outwardly bulged side portion Q in each of the left and right rear cowls 8 best shown in FIG. 8 is prevented from being urged by the luggage fastening member 19 then engaged with the front fastener stays 22 and, accordingly, a possible impairment of the rear cowls 8 is avoided. Where the front fastener stays 22 are not in use, the front fastener stays 22 are folded to the folded position P2 best shown by the phantom lines in FIG. 2 and, accordingly, the likelihood of the front fastener stays 22 being caught by the outside is avoided and the appealing appearance is also increased. Also, since the pivot axial C best shown in FIG. 1 extends in the substantially vertical direction, it is easy to arrange the corresponding foldable stay unit 16 even when the vertical space between the outwardly bulged side portion Q of the respective rear cowl 8 and the fellow passenger's seat 6, which serves as a luggage carrier rack, is small.

The first and second engagement sections 43A and 43B of the front fastener stay 22 in each of the foldable stay units 16 are positioned above the outwardly bulged side portion Q of the respective rear cowl 8, but, at the projected position P1, is positioned at the same position as that of the outermost area Q1 of the entire rear cowl 8 in the widthwise direction of the motorcycle body or inwardly thereof in the widthwise direction of the motorcycle body. Accordingly, the likelihood of the rear cowl 8 being urged by the luggage fastening member 19 can be avoided while the amount of protrusion in a direction outwardly of the rear cowl 8 is suppressed.

The motorcycle the fellow passenger's seat 6 is generally concurrently used as a luggage carrier rack. According to this embodiment, since the front fastener stay 22 is arranged forwardly of the fellow passenger's seat 6, positioning of the front fastener stay 22 at the folded position P2 shown in FIG. 2 by the two-dot chain line is effective to avoid a contact of the fellow passenger with the front fastener stay 22.

Since as shown in FIG. 6, the guide pin 32 rigid with the base 20 and the guide groove 46 formed in the front fastener stay 22 cooperate with each other to define the stroke of pivotal movement of the front fastener stay 22, no pivot occurs unnecessarily and a stabilized movement of the front fastener stay 22 can be secured. Also, even when the front fattener stay 22 is pulled by the luggage fastening member 19 best shown by the phantom line in FIG. 5, rotation beyond the stroke of pivotal movement does not occur.

Since as shown in FIG. 2 the front fastener stay 22, when and so long as held at the folded position P2, is concealed below the rider's seat 4 when viewed from top, the front fastener stay 22 becomes unvisible and the appearance of the motorcycle increased.

Also, since the elongated stay body 42 of the fastener stay 22 in each of the foldable stay units 16, when and so long as held at the projected position P1, is arranged outwardly of the that portion 80 of the rear cowl 8, which is at the same position as that of the front fastener stay 22 with respect to the longitudinal sense of the motorcycle body and which is outwardly of the widthwise direction of the motorcycle body, a space is formed below the front fastener stay 22 and, hence, an undesirable contact of the luggage fastening member 19 with the rear cowl 8 can be avoided, at the time the luggage fastening member 19 is engaged on or removed from the elongated stay body 42 of the fastener stay 22. Also, interference between the rear cowl 8 and the luggage fastening member 19 during the engagement or disengagement of the luggage fastening member 19 is avoided and the luggage tying work can be accordingly facilitated.

Since as shown in FIG. 4 each of the foldable stay units 16 is mounted on the adjacent seat rail 2 through the corresponding bracket 26, the respective foldable stay unit 16 can be mounted on the bracket 26 which has been secured to the seat rail 2 during the assembling step, in which the rear cowl 8, the rider's seat 4 and others are mounted on the seat rails 2, and, hence, the mounting work can be facilitated.

Since each of the brackets 26 best shown in FIG. 1 is covered by the left or right rear cowls 8, exposure of the respective bracket 26 to the outside is prevented, when viewed from lateral side, and the appearance of the motorcycle is therefore increased.

In addition, since the rear fastener stays 18 are also arranged each above the outer tip line L of the rear cowl 8, not only can the luggage tying be accomplished to allow the luggage to be firmly supported at two anteroposterior locations, but also the rear cowls 8 are never damaged by the luggage fastening member 19.

In the preferred embodiment described hereinbefore, each of the foldable stay units 16 has been shown and described as arranged in the cutout SP formed in the respective rear cowl 8. However, particularly where a space is available between a seat and a rear cowl, they may be arranged in such space and, alternatively, the provision may be made of a slot in the rear cowl 8 so that the fastener stay 22 can be selectively advanced or retracted through such a slot, with a portion of the fastener stay 22 exposed to the outside through such a slot. Also, in the practice of the present invention, the first and second engagement sections 43A and 43B in the front fastener stay 22 then held at the projected position P1 suffice to be positioned above the line of extension of the outer tip line L and the rear cowl 8 may not be formed at the same position as the mounting position of the fastener stay in the longitudinal direction.

Also, although in the previously described preferred embodiment, the bracket 26 when viewed from lateral side has been shown and described as covered by the rear cowl 8, a portion of the bracket 26 may be exposed through the rear cowl 8. In addition, in the previously described preferred embodiment, the pivot axis C has been shown and described as arranged outside the seat rail 2, it may be arranged inside the seat rail 2.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in the previously described embodiment, the fellow passenger's seat 6 has been shown and described as concurrently used as a luggage carrier rack, a dedicated luggage carrier rack may be employed in place of the fellow passenger's seat 6.

Also, although in the previously described embodiment the foldable stay units 16 and the rear fastener stays 18 have been shown and described as a pivotable type and a stationary type, respectively, these types may be reversed or the both may be a pivotable type. In addition, the foldable stay units 16 may be arranged only forwardly of the fellow passenger's seat 6 or the foldable stay units 16 may be arranged at a longitudinal intermediate portion of the fellow passenger's seat 6 and rearwardly thereof. The number of the fastener stays may be three or more, and in such a case, at least one pair of the fastener stays may be of the design and structure herein disclosed, i.e., the foldable stay units 16.

Yet, although in the previously described embodiment, the foldable stay unit 16 has been shown and described as supported by the motorcycle body through the corresponding bracket 26, it can be directly mounted on the motorcycle frame structure through the carrier stud 24 with no bracket 26 employed. The present invention is suitably applied to the motorcycle of a type, in which the rear cowls are used to cover the seat rails from outside. Particularly where the rear cowls are made of a resinous material, an undesirable impairment of the rear cowl caused by the luggage fastening member can be avoided effectively.

Accordingly, such changes and modifications are, unless they depart from the scope of the present invention as delivered from the claims annexed hereto, to be construed as included therein.

It is to be noted that although not included within the scope of the present invention, the fastener stay may be so formed as to slide between the seat and the side cowl in a direction widthwise of the motorcycle body to project in a direction widthwise of the motorcycle body. Even when the fastener stay is so formed as described above, the undesirable contact between the rear cowl and the luggage fastening member can be avoided to thereby avoid the likelihood of the rear cowl being impaired.

As a mode including the fastener stay of the slidable type described above, the following structure is available.

MODE

A stay device arranged in a rear portion of a motorcycle, which comprises a foldable stay unit fitted to a motorcycle frame structure, the foldable stay unit including a fastener stay movable between a projected position, at which the fastener stay projects outwardly of the motorcycle frame structure for engagement with a luggage fastening member, and a folded position at which the fastener stay is accommodated inwardly in a direction widthwise of the motorcycle, and in which the fastener stay is positioned above an outer tip line depicted by a bulged portion of the rear cowl then covering a rear side portion of the motorcycle frame structure, the bulged portion extending in the rear cowl in a direction longitudinally of the motorcycle at an outer end portion of the rear cowl.

REFERENCE NUMERAL

1 . . . Foldable stay device
2 . . . Seat rail
4 . . . Rider's seat
6 . . . Fellow passenger's seat
8 . . . Rear cowl
16 . . . Foldable stay unit
18 . . . Rear fastener stay
19 . . . Luggage fastening member
20 . . . Base
22 . . . Front fastener stay
24 . . . Carrier stud
26 . . . Bracket
32 . . . Guide pin (Stopper member)
43A, 43B . . . Engagement section
C . . . Axis of pivot
Q . . . Outwardly bulged side portion
FR . . . Motorcycle frame structure

What is claimed is:

1. A foldable stay device adapted to be arranged in a rear portion of a motorcycle, which comprises a foldable stay unit secured to a motorcycle frame structure;

the foldable stay unit comprising:

a base, a fastener stay operatively supported by the base for pivotal movement between a projected position, in which the fastener stay protrudes outwardly of a motorcycle body in readiness for engagement with a luggage fastening member, and a folded position in which the fastener stay is accommodated inwardly of the projected position in a direction widthwise of the motorcycle body, and a carrier stud for supporting the fastener stay to permit the latter to undergo the pivotal movement between the projected and folded positions about an axis of pivot extending in a substantially vertical direction with respect to the motorcycle frame structure;

in which the fastener stay, when and so long as it be held at the projected position, is arranged above an outer tip line depicted by an outwardly bulged side portion of a rear cowl, used to cover at least one side of the rear portion of the motorcycle frame structure, which line is extending in a direction longitudinally of the motorcycle frame structure.

2. The foldable stay device as claimed in claim 1, in which the fastener stay has at least one engagement section defined therein for engagement with the luggage fastening member and in which when and so long as the fastener stay is held in the projected position, the at least one engagement section assumes a position widthwise of the motorcycle body, which is the same as that of the outwardly bulged side portion of the rear cowl, or a position somewhat inwardly of such widthwise position.

3. The foldable stay device as claimed in claim 1, in which the fastener stay is arranged forwardly of a fellow passenger's seat.

4. The foldable fastener stay device as claimed in claim 1, in which the foldable stay unit also comprises a stopper member for regulating the stroke of pivotal movement of the fastener stay.

5. The foldable stay device as claimed in claim 1, in which when and so long as the fastener stay is held at the folded position, the fastener stay is concealed below a rider's seat from outside.

6. The foldable stay device as claimed in claim 1, in which the fastener stay has at least one engagement section defined therein for engagement with the luggage fastening member and in which when and so long as the fastener stay is held at the projected position, the at least one engagement section is arranged on one side outwardly of the outwardly bulged side portion of the rear cowl, which portion occupies the same longitudinal position as the foldable fastener stay, in a direction widthwise of the motorcycle body.

7. The foldable stay device as claimed in claim 1, further comprising a bracket through which the foldable stay unit is fitted to the motorcycle frame structure, the foldable stay unit being fitted to the bracket by connecting the carrier stud with the bracket.

8. The foldable stay device as claimed in claim 7, in which the bracket is covered by the rear cowl laterally from outside.

9. The foldable stay device as claimed in claim 1, further comprising at least one rear fastener stay provided rearwardly of the foldable stay unit for engagement with the luggage fastening member, the at least one rear fastener stay being arranged above the outer tip line of the rear cowl.

10. A motorcycle equipped with the foldable stay device as defined in claim 1.

* * * * *